(12) United States Patent
Xie et al.

(10) Patent No.: US 11,290,950 B1
(45) Date of Patent: Mar. 29, 2022

(54) METHOD FOR NEIGHBOR DISCOVERY IN WIRELESS AD HOC NETWORK BASED ON ADAPTIVE ANTENNA ARRAY

(71) Applicant: University of Electronic Science and Technology of China, Chengdu (CN)

(72) Inventors: Jiabei Xie, Chengdu (CN); Xuesong Tan, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 12 days.

(21) Appl. No.: 17/095,762

(22) Filed: Nov. 12, 2020

(30) Foreign Application Priority Data

Sep. 18, 2020 (CN) .......................... 202010985844.1

(51) Int. Cl.
*H04W 48/16* (2009.01)
*H04W 56/00* (2009.01)
(52) U.S. Cl.
CPC ......... *H04W 48/16* (2013.01); *H04W 56/001* (2013.01)
(58) Field of Classification Search
CPC ............................ H04W 48/16; H04W 56/001
(Continued)

(56) References Cited

PUBLICATIONS

Ram Ramanathan et al., Ad Hoc Networking With Directional Antennas: A Complete System Solution, IEEE Journal on Selected Areas in Communications, Mar. 2005, pp. 496-506, vol. 23, No. 3.
(Continued)

*Primary Examiner* — Chuck Huynh
(74) *Attorney, Agent, or Firm* — Bayramoglu Law Offices LLC

(57) ABSTRACT

A method for neighbor discovery in a wireless ad hoc network based on an adaptive antenna array includes: generating a synchronous SSS with a period length of $n+\lfloor \log_2 n \rfloor+1$ timeslots, or generating a asynchronous SSS with a period length of $4n$ timeslots; labeling the $n+\lfloor \log_2 n \rfloor+1$ timeslots in each period of the synchronous SSS by $0, 1, \ldots, n+\lfloor \log_2 n \rfloor$; labeling the $4n$ timeslots in each period of the asynchronous SSS by $0, 1, \ldots, 4n-1$; if the node is synchronized with its neighbors, representing the number of bit 0 in a binary sequence $b_0 b_1 \ldots b_{n-1}$ by a $(\lfloor \log_2 n \rfloor+1)$-bit binary sequence $c_0 c_1 \ldots c_{\lfloor \log_2 n \rfloor}$, and then appending the $(\lfloor \log_2 n \rfloor+1)$-bit binary sequence $c_0 c_1 \ldots c_{\lfloor \log_2 n \rfloor}$ behind the binary sequence $b_0 b_1 \ldots b_{n-1}$ to generate an $(n+\lfloor \log_2 n \rfloor+1)$-bit binary sequence $b_0 b_1 \ldots b_{n-1} c_0 c_1 \ldots c_{\lfloor \log_2 n \rfloor}$; otherwise, extending the binary sequence $b_0 b_1 \ldots b_{n-1}$ into a $4n$-bit binary sequence; and based on the $(n+\lfloor \log_2 n \rfloor+1)$-bit or $4n$-bit binary sequence, generating the synchronous or asynchronous SSS.

1 Claim, 3 Drawing Sheets

(58) Field of Classification Search
USPC .......................................................... 455/434
See application file for complete search history.

(56) References Cited

PUBLICATIONS

Zhijun Zhang et al., Hybrid Smart Antenna System using Directional Elements-Performance Analysis in Flat, Rayleigh Fading, IEEE MIT-S Digest, 2003, pp. 1537-1540.
Peter Strobach, Total Least Squares Phased Averaging and 3-D ESPRIT for Joint Azimuth-Elevation-Carrier Estimation, IEEE Transactions on Signal Processing, Jan. 2001, pp. 54-62, vol. 49, No. 1.
Zhi Gong Liang, Research on Neighbor Discovery Technology for Directional Antenna enabled Wireless Ad Hoc Networks, A Master Thesis Submitted to University of Electronic Science and Technology of China, 2017, pp. 1-74.

METHOD FOR NEIGHBOR DISCOVERY IN WIRELESS AD HOC NETWORK BASED ON ADAPTIVE ANTENNA ARRAY

CROSS REFERENCE TO THE RELATED APPLICATIONS

This application is based upon and claims priority to Chinese Patent Application No. 202010985844.1, filed on Sep. 18, 2020, the entire contents of which are incorporated herein by reference.

TECHNICAL FIELD

The present invention belongs to the field of communication technology, and more particularly, relates to a method for neighbor discovery in a wireless ad hoc network based on an adaptive antenna array.

BACKGROUND

Wireless ad hoc networks are multi-hop, movable, peer-to-peer, and have dynamically changing network topology without relying on fixed infrastructure. Thus, such wireless ad hoc networks are especially suitable for applications in battlefield communications, emergency rescue, Internet of Things (IoT), and vehicle networking. Each node in a wireless ad hoc network must perform neighbor discovery during the stages of networking, routing, and communication. This enables the updating of its information on neighbor nodes and network topology in real time and providing the information basis for ensuing route discovery and data transmission.

During the process of neighbor discovery, each node in a wireless ad hoc network can use directional antennas[1] that provide significant transmission and reception ability within in a particular direction. This increases its transmission distance for discovering more neighbor nodes and enhances its anti-jamming ability as well as communication confidentiality. On the other hand, due to the imbalance of the transmission and reception gains in different directions, any two neighbor nodes are able to find each other only when their antennas are directed towards one another. This poses a challenge for the neighbor discovery in the wireless ad hoc network.

To reduce the impact of the said challenge on the performance of neighbor discovery, nodes in a wireless ad hoc network can adopt a special directional antenna, namely an Adaptive Antenna Array (AAA)[2], [3]. Since the AAA can track the arrival angle of the receiving signal in real time and adjust the angle of its main beam quickly to achieve the optimal signal gain, it can afford the function of omni-directional monitoring/receiving and directional transmission concurrently. Therefore, a key problem for a wireless ad hoc network equipped with one AAA at each node to perform neighbor discovery is to ensure that, without knowing each other's positions and with/without knowing each other's clocks, any two network nodes are able to constantly able have their AAAs pointing to each other within a time period of limited length for achieving the opportunity of mutual discovery. For this purpose, each network node must preset an appropriate sequence of state switching (SSS) for guiding its AAA to transmit directionally or receive omni-directionally in each timeslot of neighbor discovery and also specifying its AAA direction in each transmission timeslot.

One of the typical metrics for evaluating the performance of an SSS in the neighbor discovery of an AAA-based wireless ad hoc network is the Maximum Time-To-Rendezvous (MTTR), which means the maximum number of timeslots between two consecutive opportunities of neighbor discovery, that is, the AAA of a transmitting node points to the AAA of a receiving node. In general, the smaller the MTTR of an SSS, the better the performance of neighbor discovery in a wireless ad hoc network adopting this SSS.

[1] R. Ramanathan, J. Redi, C. Santivanez, D. Wiggins and S. Polit, "Ad hoc networking with directional antennas: a complete system solution," in IEEE Journal on Selected Areas in Communications, vol. 23, no. 3, pp. 496-506, March 2005.

[2] Zhijun Zhang, M. F. Iskander, Zhengqing Yun and A. Host-Madsen, "Hybrid smart antenna system using directional elements-performance analysis in flat Rayleigh fading," in IEEE Transactions on Antennas and Propagation, vol. 51, no. 10, pp. 2926-2935, October 2003.

[3] P. Strobach, "Total least squares phased averaging and 3-D ESPRIT for joint azimuth-elevation-carrier estimation," in IEEE Transactions on Signal Processing, vol. 49, no. 1, pp. 54-62, January 2001.

[4] Zhigong Liang, Research on Neighbor Discovery Technology for Directional Antenna enabled Wireless Ad hoc Networks, Master Thesis of University of Electronic Science and Technology of China, June 2020.

SUMMARY

In order to facilitate the initialization or periodic networking of AAA-based wireless ad hoc networks, the present invention proposes an SSS for guiding the AAA of each network node, which may or may not be synchronized with its neighbors, to switch the transmission or receiving states of the AAA in the period of neighbor discovery.

The technical solution of the present invention provides a method for neighbor discovery in a wireless ad hoc network based on an adaptive antenna array. Each node in the wireless ad hoc network is equipped with an AAA with m sectors and uniquely labeled by an n-bit binary sequence $b_0 b_1 \ldots b_{n-1}$. The method for neighbor discovery includes the following steps:

S1: generating a periodic synchronous SSS with the period length of $n + \lfloor \log_2 n \rfloor + 1$ timeslots for the AAA, or generating a periodic asynchronous SSS with the period length of $4n$ timeslots for the AAA;

S2: defining the SSS of the node by the following steps:

S21: labeling the $n + \lfloor \log_2 n \rfloor + 1$ timeslots in each period of the periodic synchronous SSS by $0, 1, \ldots, n + \lfloor \log_2 n \rfloor$; labeling the $4n$ timeslots in each period of the periodic asynchronous SSS by $0, 1, \ldots, 4n-1$; dividing each timeslot into m equal-length mini-slots which are labeled by $0, 1, \ldots, m-1$; and labeling the m sectors of the AAA of the node by $0, 1, \ldots, m-1$;

S22: if the node is synchronized with its neighbors, first representing the number of the bit 0 in the binary sequence $b_0 b_1 \ldots b_{n-1}$ by a $(\lfloor \log_2 n \rfloor + 1)$-bit binary sequence $c_0 c_1 \ldots c_{\lfloor \log_2 n \rfloor}$, wherein $c_0$ and $c_{\lfloor \log_2 n \rfloor}$ are the most significant bit and the least significant bit, respectively, and then appending the newly generated binary sequence behind the binary sequence $b_0 b_1 \ldots b_{n-1}$ to generate an $(n + \lfloor \log_2 n \rfloor + 1)$-bit binary sequence $b_0 b_1 \ldots b_{n-1} c_0 c_1 \ldots c_{\lfloor \log_2 n \rfloor}$, and proceeding to step S23; otherwise, extending the binary sequence $b_0 b_1 \ldots b_{n-1}$ into a $4n$-bit binary sequence according to the following rule:

appending an n-bit binary sequence $\tilde{b}_0 \tilde{b} \ldots \tilde{b}_{n-1}$ behind the binary sequence $b_0 b_1 \ldots b_{n-1}$ to generate a 2n-bit binary sequence, wherein the n-bit binary sequence $\tilde{b}_0 \tilde{b}_1 \ldots \tilde{b}_{n-1}$ is generated by inverting each bit of the binary sequence $b_0b_1 \ldots b_{n-1}$, then appending n bits 0 and n bits 1 sequentially behind the 2n-bit binary sequence, and proceeding to step S24;

S23: based on the generated $(n+\lfloor \log_2 n \rfloor + 1)$-bit binary sequence, generating the periodic synchronous SSS with the period length of $n+\lfloor \log_2 n \rfloor + 1$ timeslots for guiding the AAA to switch the transmission or receiving states of the AAA according to the following rule:

if the $(v+1)^{th}$ bit of the $(n+\lfloor \log_2 n \rfloor + 1)$-bit binary sequence is 1, wherein $v \in [0, n+\lfloor \log_2 n \rfloor]$, the node transmits its control information in the $(k+1)^{th}$ sector of its AAA within the $(k+1)^{th}$ mini-slot of the $(v+1)^{th}$ timeslot of each period, wherein $k \in [0, m-1]$; otherwise, the node keeps listening within the $(v+1)^{th}$ timeslot of each period;

S24: based on the generated 4n-bit binary sequence, generating the asynchronous SSS with the period length of 4n timeslots for guiding the AAA to switch the transmission or receiving states of the AAA according to the following rule:

if the $(w+1)^{th}$ bit of the 4n-bit binary sequence is 1, wherein $w \in [0, 4n-1]$, the node transmits its control information in the $(k+1)^{th}$ sector of its AAA within the $(k+1)^{th}$ mini-slot of the $(w+1)^{th}$ timeslot of each period, wherein $k \in [0, m-1]$; otherwise, the node keeps listening within the $(w+1)^{th}$ timeslot of each period; and S3: transmitting and receiving the control information by each node according to the SSS generated in step S2; wherein, if any two nodes S and R begin to switch the state of their AAA at the same time, then the node S always obtains at least one opportunity to discover the node R within any $n+\lfloor \log_2 n \rfloor + 1$ consecutive timeslots and the latter will also obtain at least one opportunity to discover the former within the same time period; otherwise, regardless of the time difference for the nodes S and R to begin activating their SSS, the node S always obtains at least one opportunity to discover the node R within any 4n consecutive timeslots and the latter will also obtain at least one opportunity to discover the former within the same time period.

The present invention has the following advantages. The proposed SSS ensures that, regardless of the time difference for the AAAs of two nodes to begin activating SSS, the two nodes can always obtain an opportunity to discover each other within a time period of limited length. Compared with the prior AAA-based SSS, the SSS proposed in the present invention has a smaller MTTR and hence can afford any two nodes in a wireless ad hoc network with opportunities to discover each other in a shorter time period. As shown in FIG. 7, when the length of the binary sequences for each node in a wireless ad hoc network is set as 2, 3, 4, 5, 6, 7, 8, 9, or 10, respectively, the SSS generated by the prior art reference[4] has an MTTR of 4, 6, 8, 10, 12, 14, 16, 18, or 20, while the SSS generated by the present invention has an MTTR of 4, 5, 7, 8, 9, 10, 12, 13, or 14. This implies that, when all nodes labeled by n-bit binary sequence are synchronized, the SSS generated by the present invention will afford the mutual discovery between any two nodes with a smaller MTTR than that generated by the prior art reference [4].

DETAILED DESCRIPTION OF THE EMBODIMENTS

The technical solution of the present invention will be described in detail below with reference to the drawings and embodiments. One embodiment is for the AAA-based neighbor discovery between synchronized nodes, and the other embodiment is for the AAA-based neighbor discovery between asynchronous nodes.

Embodiment 1

For a node in a wireless ad hoc network, which is equipped with a 5-sector AAA and uniquely labeled by a 4-bit binary sequence 1001, a periodic synchronous SSS for the AAA is generated by the following steps:

Step 1: The 7 equal-length timeslots in each period of the generated synchronous SSS are labeled by 0, 1, . . . , 6. Each timeslot is divided into 5 equal-length mini-slots which are labeled by 0, 1, 2, 3, and 4. The m sectors of the AAA of the node 1001 are labeled by 0, 1, 2, 3, and 4.

Step 2: The number of the bit 0 in the binary sequence 1001 is represented by a 3-bit binary sequence 010, and then the newly generated binary sequence is appended behind the binary sequence 1001 to generate a 7-bit binary sequence 1001010.

Step 3: Based on the 7-bit binary sequence generated in step 2, the final periodic synchronous SSS with the period length of 7 timeslots is generated according to the following rule:

If the $(v+1)^{th}$ bit of the 7-bit binary sequence is 1, wherein $v \in [0, 6]$, then the node will transmit its control information in the $(k+1)^{th}$ sector of its AAA within the $(k+1)^{th}$ mini-slot of the $(v+1)^{th}$ timeslot of each period, wherein $k \in [0, 4]$; otherwise, the node will keep listening within the $(v+1)^{th}$ timeslot of each period.

Figure 1:
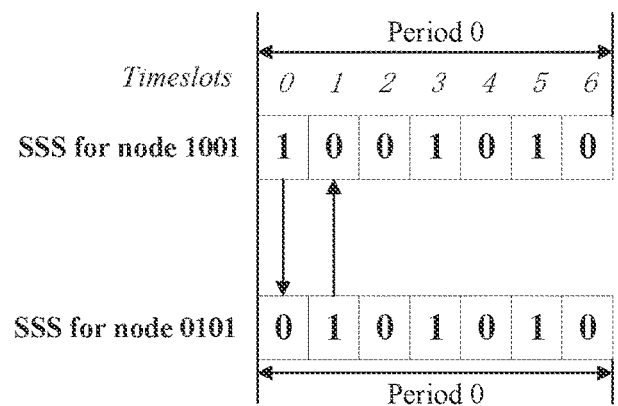
FIG. 1 depicts the neighbor discovery opportunities in one 7-timeslot period of two synchronized periodic SSSs, which are generated by the two nodes 1001 and 0101 in an AAA-based wireless ad hoc network.
Figure 2:
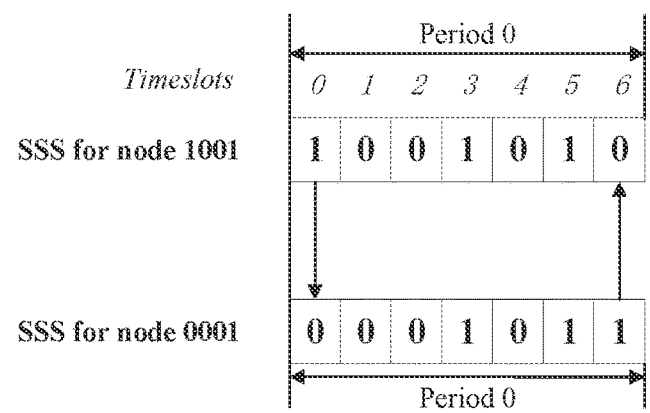
FIG. 2 depicts the neighbor discovery opportunities in one 7-timeslot period of two synchronized periodic SSSs, which are generated by the two nodes 1001 and 0001 in an AAA-based wireless ad hoc network.

Referring to FIG. 1 and FIG. 2, in both sequences, each bit 1 and 0, respectively, represents that the AAA of a node should adopt the transmission or receiving state in the corresponding timeslot. When these two nodes begin to switch the state of their AAA at the same time, the node 1001 will always obtain one opportunity to discover the node 0101 in timeslot 1 of each 7-timeslot period, and the latter will always obtain one opportunity to discover the former in timeslot 0 of the same period. Similarly, the node 1001 will always obtain one opportunity to discover the node 0001 in timeslot 6 of each 7-timeslot period, and the latter will always obtain one opportunity to discover the former in timeslot 0 of the same period.

Figure 5:
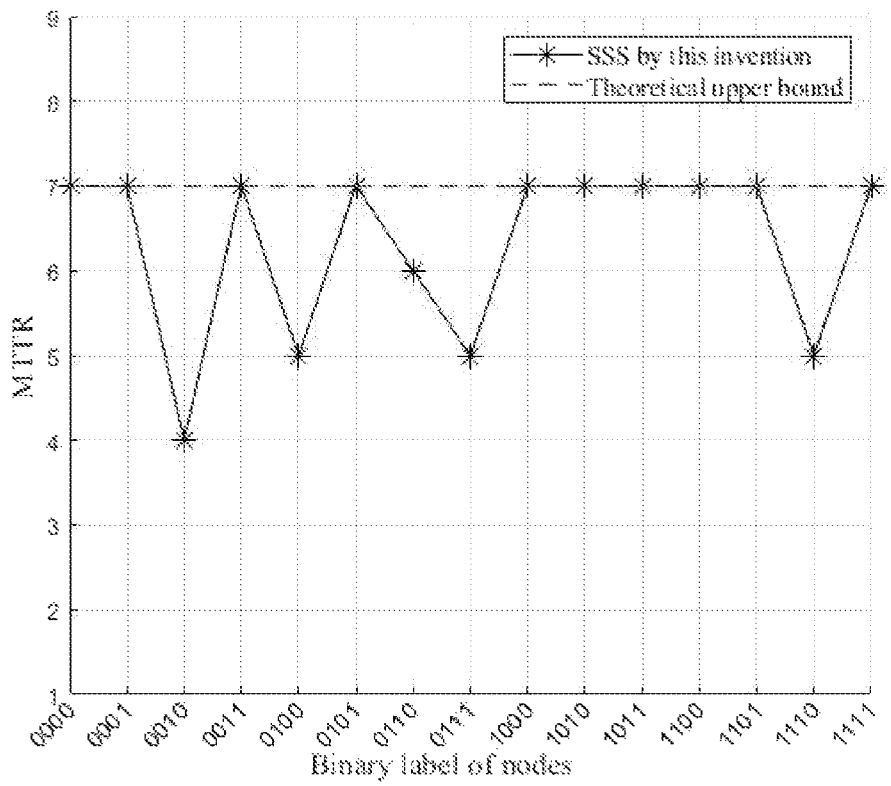
FIG. 5 depicts the MTTR that the node 1001 requires to accomplish mutual discovery with the node 0010, 0100, 0110, 0111, or 1110, respectively, as well as the node labeled by each of the remaining nodes labeled by 4-bit binary sequences under the constraint of time clock synchronization.

Referring to FIG. 5, under the constraint of time clock synchronization, the node 1001 requires an actual MTTR of 4, 5, 6, 5, or 5 timeslots to accomplish the mutual discovery with the node 0010, 0100, 0110, 0111, or 1110, respectively, and requires an actual MTTR of 7 timeslots, which is the theoretical upper bound of the MTTR, to accomplish the mutual discovery with the node labeled by each of the remaining 4-bit binary sequences. This means that if nodes in a wireless ad hoc network begin to switch the state of their AAA at the same time, the node 1001 will always obtain at least one opportunity to discover any other node within any 7 consecutive timeslots, and the latter will always obtain at least one opportunity to discover the former within the same period.

Embodiment 2

For a node in a wireless ad hoc network, which is equipped with a 5-sector AAA and uniquely labeled by a 4-bit binary sequence 1001, a periodic asynchronous SSS for the AAA is generated by the following steps:

Step 1: The 16 equal-length timeslots in each period of the generated asynchronous SSS are labeled by 0, 1, . . . , 15. Each timeslot is divided into 5 equal-length mini-slots which are labeled by 0, 1, 2, 3, and 4. The m sectors of the AAA of the node 1001 are labeled by 0, 1, 2, 3, and 4.

Step 2: The binary sequence 1001 is extended into a 16-bit binary sequence according to the following rule:

A 4-bit binary sequence 0110, which is newly generated by inverting each bit of the binary sequence 1001, is appended behind the binary sequence 1001, to generate an 8-bit binary sequence 10010110, and then 4 bits 0 and 4 bits 1 are sequentially appended behind the 8-bit binary sequence to generate a 16-bit binary sequence 1001011000001111.

Step 3: Based on the 16-bit binary sequence generated in step 2, the final periodic asynchronous SSS with the period length of 16 timeslots is generated according to the following rule:

If the $(w+1)^{th}$ bit of the 16-bit binary sequence is 1, wherein $w \in [0, 15]$, then the node will transmit its control information in the $(k+1)^{th}$ sector of its AAA within the $(k+1)^{th}$ mini-slot of the $(w+1)^{th}$ timeslot of each period, wherein $k \in [0, 4]$; otherwise, the node will keep listening within the $(w+1)^{th}$ timeslot of each period.

Figure 3:
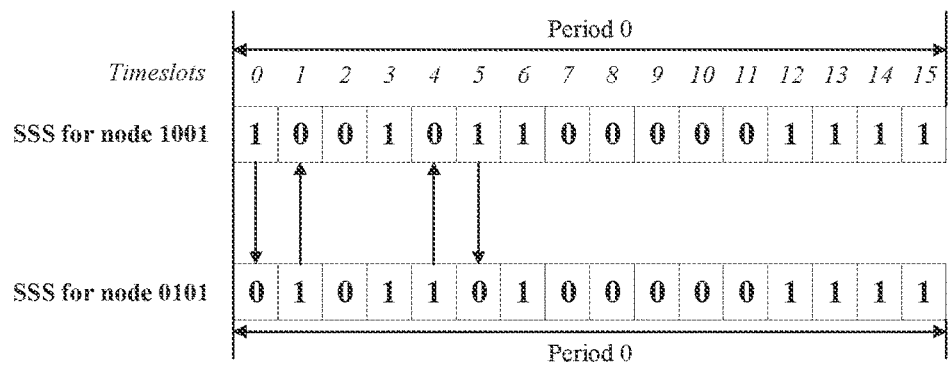
FIG. 3 depicts the neighbor discovery opportunities in one 16-timeslot period of two synchronized periodic SSSs, which are generated by the two nodes 1001 and 0101 in an AAA-based wireless ad hoc network.
Figure 4:
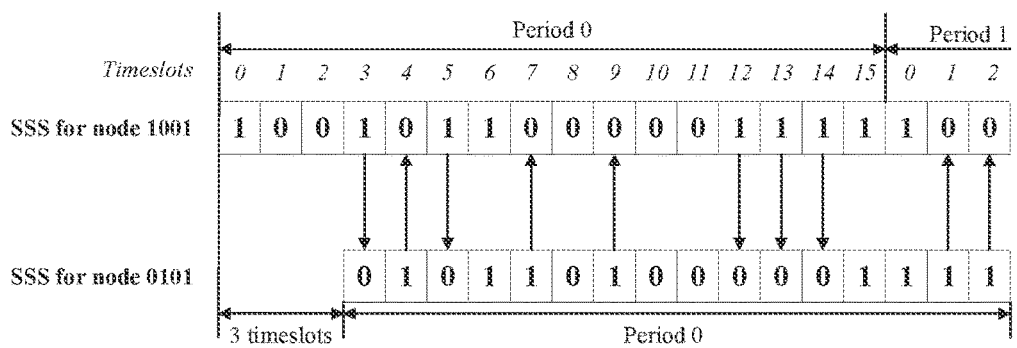
FIG. 4 depicts the neighbor discovery opportunities in one 16-timeslot period of the two periodic SSSs, which are generated by the two nodes 1001 and 0101 in an AAA-based wireless ad hoc network.

Referring to FIG. 3, in both sequences, each bit 1 and 0, respectively, represents that the AAA of a node should adopt the transmission or receiving state in the corresponding timeslot. When these two nodes begin to switch the state of their AAA at the same time, the node 1001 will always obtain two opportunities to discover the node 0101 in timeslots 1 and 4 of each 16-timeslot period, while the latter will always obtain two opportunities to discover the former in timeslots 0 and 5 of the same period. Referring to FIG. 4, when the node 1001 begins to switch the state of its AAA 3 timeslots before the node 0101, the node 1001 will always obtain three opportunities to discover the node 0101 in timeslots 4, 7, and 9 of each 16-timeslot period of the node 1001, while the latter will always obtain five opportunities to discover the former in timeslots 3, 5, 12, 13, and 14 of the same period.

Figure 6:
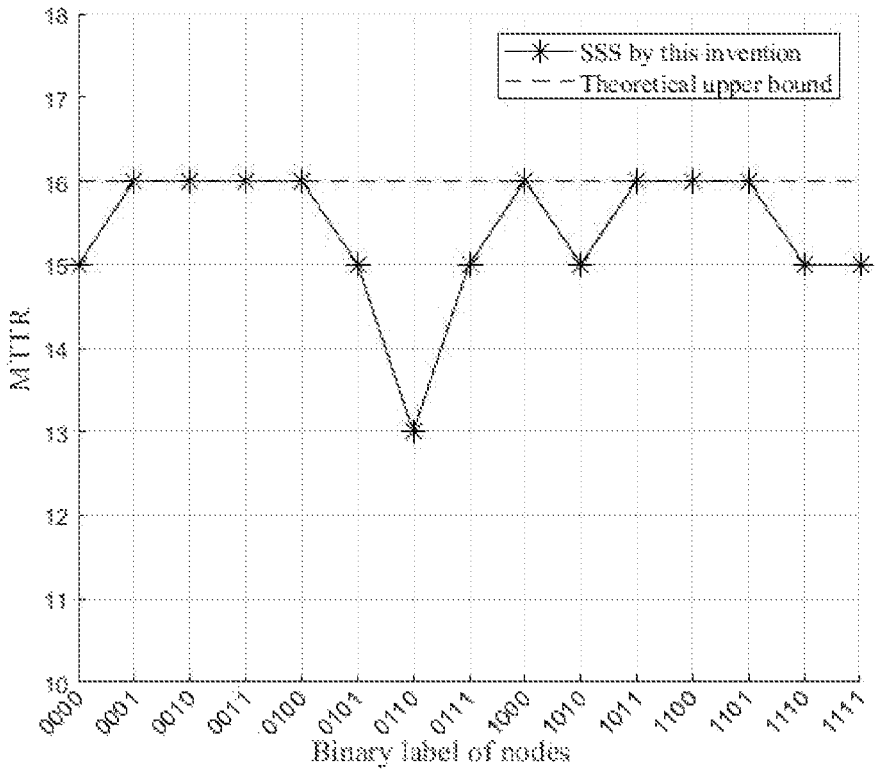
FIG. 6 depicts the MTTR that the node 1001 requires to accomplish mutual discovery with the node 0000, 0101, 0110, 0111, 1010, 1110, or 1111, respectively, as well as the node labeled by each of the remaining nodes labeled by 4-bit binary sequences in the case of asynchronous time clock for different network nodes.
Figure 7:
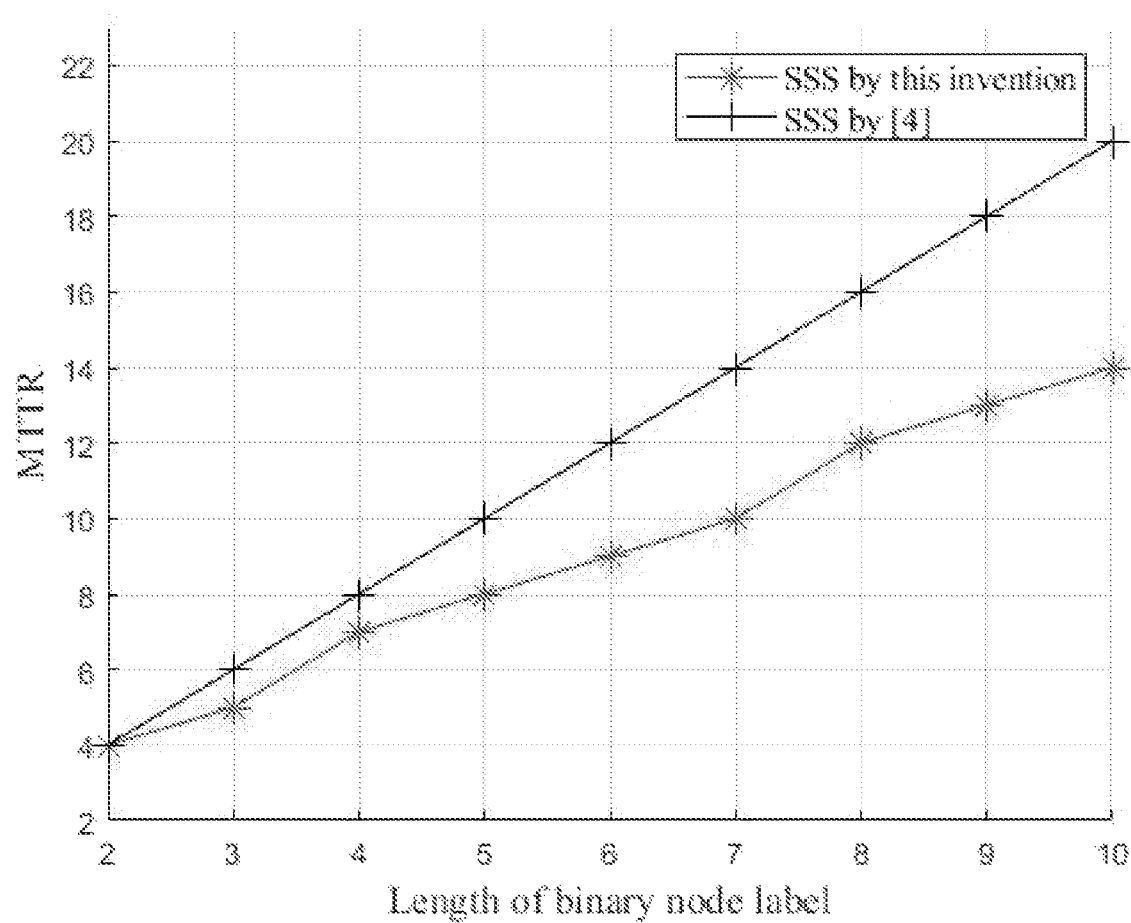
FIG. 7 depicts a comparison between the actual MTTR of the SSS generated by the present invention and the actual MTTR of the SSS generated by the prior art reference [4].

Referring to FIG. 6, in the case of asynchronous time clock for different network nodes, the node 1001 requires an actual MTTR of 15, 15, 13, 15, 15, 15, or 15 timeslots to accomplish the mutual discovery with the node 0000, 0101, 0110, 0111, 1010, 1110, or 1111, respectively, and requires an actual MTTR of 16 timeslots, which is the theoretical upper bound of the MTTR, to accomplish the mutual discovery with the node labeled by each of the remaining 4-bit binary sequences. This means that, regardless of the time difference for the nodes in a wireless ad hoc network to begin activating their SSS, the node 1001 will always obtain at least one opportunity to discover any other node within any 16 consecutive timeslots, and the latter will always obtain at least one opportunity to discover the former within the same period.

What is claimed is:

1. A method for neighbor discovery in a wireless ad hoc network based on an adaptive antenna array (AAA), wherein each node in the wireless ad hoc network is equipped with the AAA with m sectors and uniquely labeled by an n-bit binary sequence $b_0 b_1 \ldots b_{n-1}$;

the method comprises the following steps:

S1: generating a periodic synchronous sequence of state switching (SSS) with a period length of $n + \lfloor \log_2 n \rfloor + 1$ timeslots for the AAA of a node, or generating a periodic asynchronous SSS with a period length of 4n timeslots for the AAA of the node;

S2: defining the periodic synchronous SSS and the periodic asynchronous SSS of the node by the following steps:

S21: labeling the $n + \lfloor \log_2 n \rfloor + 1$ timeslots in each period of the periodic synchronous SSS by 0, 1, . . . , $n + \lfloor \log_2 n \rfloor$; labeling the 4n timeslots in each period of the periodic asynchronous SSS by 0, 1, . . . , 4n−1; dividing each timeslot of the $n + \lfloor \log_2 n \rfloor + 1$ timeslots and the 4n timeslots into m equal-length mini-slots labeled by 0, 1, . . . , m−1; and labeling the m sectors of the AAA of the node by 0, 1, . . . , m−1;

S22: if the node is synchronized with neighbors of the node, first representing a number of bit 0 in a binary sequence $b_0 b_1 \ldots b_{n-1}$ by a $(\lfloor \log_2 n \rfloor + 1)$-bit binary sequence $c_0 c_1 \ldots c_{\lfloor \log_2 n \rfloor}$, wherein $c_0$ and $c_{\lfloor \log_2 n \rfloor}$ are a most significant bit and a least significant bit, respectively, and then appending the $(\lfloor \log_2 n \rfloor + 1)$-bit binary sequence $c_0 c_1 \ldots c_{\lfloor \log_2 n \rfloor}$ behind the binary sequence $b_0 b_1 \ldots b_{n-1}$ to generate an $(n + \lfloor \log_2 n \rfloor + 1)$-bit binary sequence $b_0 b_1 \ldots b_{n-1} c_0 c_1 \ldots c_{\lfloor \log_2 n \rfloor}$, and proceeding to step S23; if the node is not synchronized with the neighbors of the node, extending the binary sequence $b_0 b_1 \ldots b_{n-1}$ into a 4n-bit binary sequence according to the following rule:

appending an inverted n-bit binary sequence $\tilde{b}_0 \tilde{b}_1 \ldots \tilde{b}_{n-1}$ behind the binary sequence $b_0 b_1 \ldots b_{n-1}$ to generate a 2n-bit binary sequence, wherein the inverted n-bit binary sequence $\tilde{b}_0 \tilde{b}_1 \ldots \tilde{b}_{n-1}$ is generated by inverting each bit of the binary sequence $b_0 b_1 \ldots b_{n-1}$, then appending n bits 0 and n bits 1 sequentially behind the 2n-bit binary sequence, and proceeding to step S24;

S23: based on the $(n + \lfloor \log_2 n \rfloor + 1)$-bit binary sequence, generating the periodic synchronous SSS with the period length of the $n + \lfloor \log_2 n \rfloor + 1$ timeslots for guiding the AAA to switch transmission or receiving states of the AAA according to the following rule:

if a $(v+1)^{th}$ bit of the $(n+\lfloor \log_2 n \rfloor +1)$-bit binary sequence is 1, wherein $v \in [0, n+\lfloor \log_2 n \rfloor]$, the node transmits control information of the node in a $(k+1)^{th}$ sector of the AAA of the node within a $(k+1)^{th}$ mini-slot of a $(v+1)^{th}$ timeslot of each period, wherein $k \in [0, m-1]$; if the $(v+1)^{th}$ bit of the $(n+\lfloor \log_2 n \rfloor +1)$-bit binary sequence is not 1, the node keeps listening within the $(v+1)^{th}$ timeslot of each period;

S24: based on the 4n-bit binary sequence, generating the periodic asynchronous SSS with the period length of the 4n timeslots for guiding the AAA to switch the transmission or receiving states of the AAA according to the following rule:

if a $(w+1)^{th}$ bit of the 4n-bit binary sequence is 1, wherein $w \in [0, 4n-1]$, the node transmits the control information of the node in the $(k+1)^{th}$ sector of the AAA of the node within a $(k+1)^{th}$ mini-slot of a $(w+1)^{th}$ timeslot of each period, wherein $k \in [0, m-1]$; if the $(w+1)^{th}$ bit of the 4n-bit binary sequence is not 1, the node keeps listening within the $(w+1)^{th}$ timeslot of each period; and S3: transmitting and receiving the control information by the each node according to the periodic synchronous SSS and the periodic asynchronous SSS generated in step S2; wherein, if a first node and a second node begin to switch the transmission or receiving states of the AAA of the first node and the transmission or receiving states of the AAA of the second node simultaneously, then the first node always obtains at least one opportunity to discover the second node within $n+\lfloor \log_2 n \rfloor +1$ consecutive timeslots, and the second node also obtains at least one opportunity to discover the first node within the $n+\lfloor \log_2 n \rfloor +1$ consecutive timeslots; if the first node and the second node begin to switch the transmission or receiving states of the AAA of the first node and the transmission or receiving states of the AAA of the second node non-simultaneously, the first node always obtains at least one opportunity to discover the second node within 4n consecutive timeslots, and the second node also obtains at least one opportunity to discover the first node within the 4n consecutive timeslots.

\* \* \* \* \*